United States Patent [19]

Tanimizu et al.

[11] Patent Number: 5,280,826
[45] Date of Patent: Jan. 25, 1994

[54] COULTER ADJUSTING DEVICE FOR REVERSIBLE PLOW

[75] Inventors: Mikio Tanimizu; Kouichi Kawano, both of Ibaraki, Japan

[73] Assignee: Sugano Farm Machinery Mfg. Co., Ltd., Hokkaido, Japan

[21] Appl. No.: 943,870

[22] Filed: Sep. 11, 1992

[30] Foreign Application Priority Data

Sep. 20, 1991 [JP] Japan .................................. 3-268532
Sep. 20, 1991 [JP] Japan .................................. 3-268533

[51] Int. Cl.$^5$ .......................... A01B 3/28; A01B 5/08; F16H 27/04
[52] U.S. Cl. ..................................... 172/162; 172/166; 172/224; 172/141; 74/84 R
[58] Field of Search ............... 172/162, 165, 166, 224, 172/141, 684; 74/84 R, 104, 96

[56] References Cited

U.S. PATENT DOCUMENTS 2,481,115  9/1949  Heurtier ........................ 74/84 R
2,891,459  6/1959  Tominac ........................ 172/162

Primary Examiner—Eric K. Nicholson
Assistant Examiner—Christopher J. Novosai
Attorney, Agent, or Firm—Sughrue, Mion, Zinn, Macpeak & Seas

[57] ABSTRACT

A coulter adjusting device for use in a reversible plowing machine having a non-reversible mast frame, a bottom frame secured to the non-reversible mast frame in such a manner as to be rotatable or reversible relative to the non-reversible mast frame, a rotatable shaft for rotating or reversing the bottom frame, plural pairs of bottoms fixed to the bottom frame such that each pair of bottoms is secured to upper and lower sides of the bottom frame respectively, and coulters provided in correspondence with each pair of bottoms, at least one of the coulters being secured to the non-reversible mast frame, includes an adjusting mechanism the position of the coulter secured to the non-reversible mast frame by inclining the coulter on a plane perpendicular to a plowing direction by an angle corresponding to the plowing depth, or by moving the coulter in the plowing width direction by an amount corresponding to the tread of a tractor interlockingly with a reversing operation of the bottom frame.

6 Claims, 11 Drawing Sheets

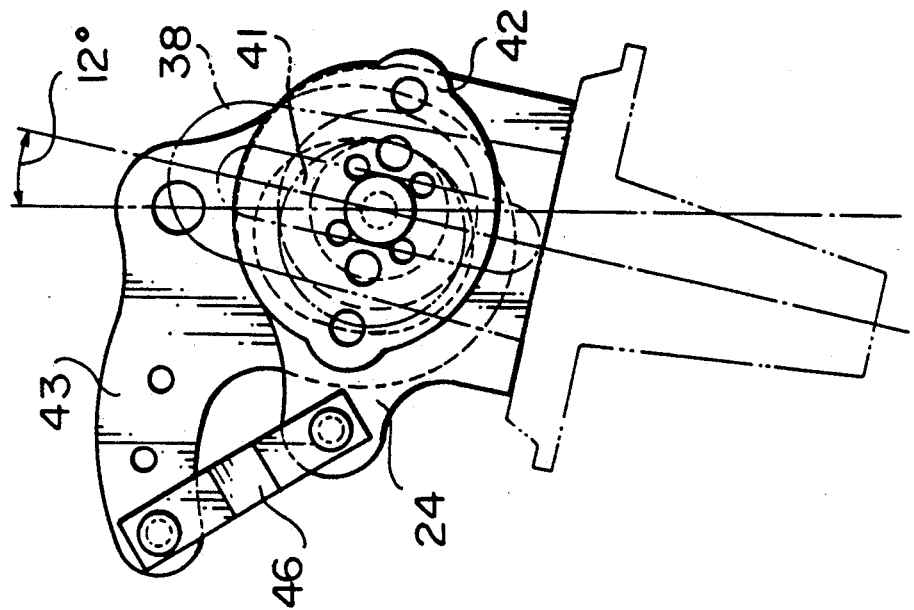
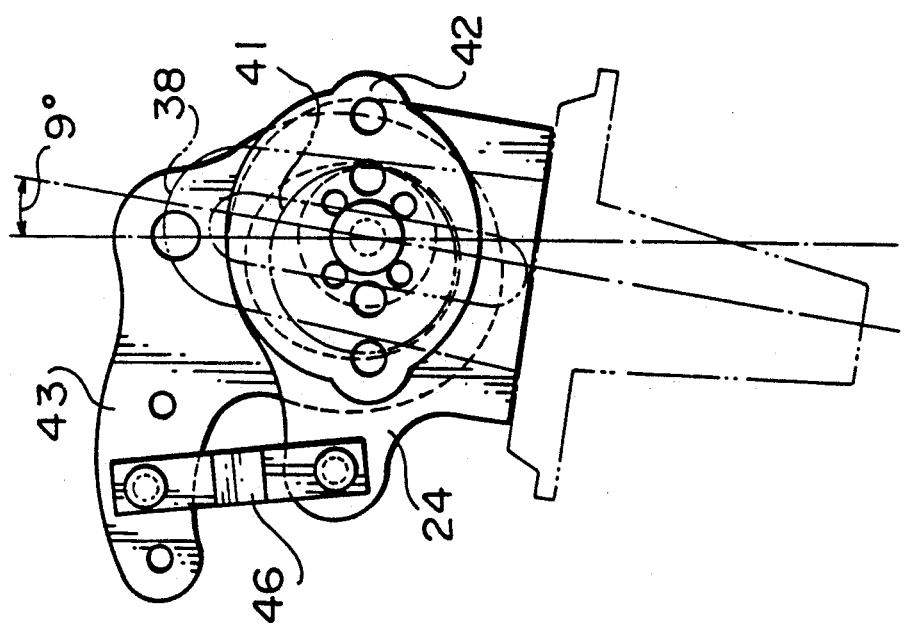

COULTER ADJUSTING DEVICE FOR REVERSIBLE PLOW

BACKGROUND OF THE INVENTION

1. Field of the Invention

This invention relates to a coulter adjusting device for a reversible plow, and particularly to a coulter adjusting device for a reversible plow in which a coulter fixed to a mast frame side is swingable (i.e., movable angularly) and/or movable in a plowing width direction in accordance with variation in the plowing depth or the tread of a tractor for hauling the reversible plow.

2. Description of Related Art

A bottom plowing machine is conventionally used as one type of agricultural machine for performing plowing. In order to perform plowing of a field using the bottom plowing machine, the bottom plowing machine is hauled by a tractor while a bottom of the bottom plowing machine plows the soil with a predetermined plowing depth. In the conventional bottom plowing machine, during the plowing operation, the soil (i.e., conglomerate clay) is plowed up (scraped out) by the bottom to form a groove and the plowed-up soil is placed at only the right side of the groove with respect to a plowing direction while the plowing machine is reversed. After one groove is formed, the tractor is turned on a headland, and then the above operation is repeated to form the next groove. Therefore, to perform plowing with the conventional bottom plowing machine, an opening (i.e., grooving) operation must be performed at a central portion of a field (i.e., several portions of the field when the field is wide) initially, and then a predetermined plowing operation in accordance with a plowing manner is carried out. As a result, in the plowed field, the reversely scraped-out soil is piled symmetrically with respect to the groove which is formed during the plowing operation. Therefore, plowing and preparation of the field takes a long time, and the headland must be plowed up and the plowed-up soil is reversely piled up at the last stage, so that the conventional bottom plowing machine has poor working efficiency.

Recognizing that the working efficiency could be improved if plowing is continuously carried out, a reversible plowing machine has been recently proposed which has bottoms at upper and lower sides of a bottom frame. In a plowing operation using the reversible plowing machine, the tractor is turned on a headland after plowing one line on a field (that is, one groove is formed), and then the bottoms at the upper and lower sides are reversed to plow an unplowed line adjacent the plowed line. Therefore, a continuous plowing operation can be carried out using the reversible plowing machine by intermittently reversing the bottoms.

The reversible plowing machine comprises a reversible plow frame to which bottoms are secured, a non-reversible mast frame which is linked to a tractor through a three-point link, and coulters each provided in correspondence with each bottom and which serve to cut the soil. In a conventional bottom plowing machine using fixed or non-reversible bottoms, each of the coulters is fixedly disposed in front of each corresponding bottom in a plowing direction because the bottom itself is fixed or non-reversible. Accordingly, a problem occurs in the positioning of the coulters.

As the simplest means of solving this problem, a reversible bottom plowing machine as shown in FIG. 16 may be employed. As shown in FIG. 16, all coulters 1a, 2a, 3a, and 4a which are assigned to bottoms 1, 2, 3 and 4, respectively, are secured to a plow frame 5 so as to be rotatable together with the plow frame 5 relative to a non-reversible front frame 7 by extending and contracting a reversing cylinder 6. This machine has no problem in construction as compared to the system above, but has a problem in the driving force for plowing. That is, the plowing machine having the construction as described above has an extremely long body at the rear side of a cross bar, and thus a point of application of force against tractive resistance for the plowing is excessively deviated to a rear side, so that the tractor's driving force is ineffectively used.

In order to overcome the above disadvantages, a first coulter which is assigned to a first bottom (i.e., nearest to the tractor) is fixedly secured to a mast frame serving as a non-reversible or fixed member. However, a plow width (defined as the width of an area to be plowed in a plowing operation for one line) is unintentionally varied due to inclination of a tractor which is also varied in accordance with a plow depth (defined as the depth of the area to be plowed), so that the position of the coulters must be adjusted in a width direction of the plowing in correspondence with a reversing operation of the bottoms.

Further, in a tractor having a prescribed tread, a first coulter is frequently not disposed in front of a corresponding first bottom after the reversing operation of the bottoms. That is, the disposed position of the coulter in the reversing operation is dependent on the tractor tire tread. Accordingly, the position of the coulters must also be adjusted in the width direction in accordance with the tractor tread. To meet such a requirement, the plowing machine is mechanically more complicated.

In order to solve the problem in the position adjustment of the coulters, the same applicant has previously proposed two types of coulter adjusting devices as disclosed in Japanese Post-Examined Publication Nos. 61-25321 and 1-59841, respectively.

According to the coulter adjusting device as described above, the adjustment of offset and inclination of the coulters which are caused by a reversing operation of the bottoms can be performed by effectively using the property of the reversible plow machine. However, conventionally this adjustment has been manually carried out by the operator, and thus the adjustment operation is relatively cumbersome.

SUMMARY OF THE INVENTION

An object of this invention is to provide a coulter adjusting device for a reversible plowing machine in which interlockingly with the reversing operation of the bottoms, the position adjustment of at least a first coulter can be automatically performed by inclining the coulter by an angle corresponding to inclination of the tractor in accordance with a plow depth.

Another object of this invention is to provide a coulter adjusting device for a reversible plowing machine in which interlockingly with the reversing operation of the bottoms, the position adjustment of at least a first coulter can be automatically performed by moving the coulter in the plowing width direction by a distance corresponding to the tractor tread.

In order to attain the above objects, a coulter adjusting device according to this invention is provided for use in a reversible plowing machine having a non-reversible mast frame, a bottom frame secured to the non-reversible mast frame so as to be rotatable or reversible relative to the non-reversible mast frame, a rotatable shaft for rotating or reversing the bottom frame, plural pairs of bottoms fixed to the bottom frame such that each pair of bottoms is secured to upper and lower sides of the bottom frame respectively, and coulters provided in correspondence with each pair of bottoms, with at least one of the coulters being secured to the non-reversible mast frame.

The coulter adjusting device includes a mechanism for adjusting the position of the coulter secured to the non-reversible mast frame by moving the coulter on a plane perpendicular to a plowing direction by a desired amount in accordance with at least one of a plowing depth and a tractor tire tread interlockingly with a reversing operation of the bottom frame, wherein the adjusting mechanism comprises a mechanism for supporting the coulter, and a coulter moving mechanism secured to the coulter support mechanism for converting a reversing motion of the bottom frame to an eccentrically-rotational motion thereof to thereby move the coulter support mechanism by an amount corresponding to an eccentric amount of the coulter moving mechanism.

According to one aspect of this invention, the coulter moving mechanism may include a swing mechanism for converting the eccentrically-rotational motion to a swing or angular motion of the coulter support mechanism on the plane, the eccentric amount corresponding to an angle of the angular motion of the coulter support mechanism to thereby incline the coulter on the plane by the angle interlockingly with the reversing motion of the bottom frame so that the coulter is maintained vertically to the surface of soil.

According to the coulter adjusting device thus constructed, the rotational motion of the bottom in the reversing operation is converted to the swing motion by the coulter moving mechanism, and the coulter support mechanism is swung through the swing motion to incline or angularly move the coulter by an angle corresponding to the plowing depth.

According to another aspect of this invention, the coulter moving mechanism may include a mechanism for converting the eccentrically-rotational motion to a shift motion of the coulter support mechanism in a plow-width direction on the plane, the eccentric amount corresponding to a shift amount of the shift motion of the coulter support mechanism to thereby shift the coulter of the plane by the shift amount interlockingly with the reversing motion of the bottom frame, so that the coulter is maintained in front of the corresponding bottom.

According to the coulter adjusting device thus constructed, the rotational motion of the bottom in the reversing operation is converted to the shift motion by the coulter moving mechanism, and the coulter support mechanism is shifted in the plowing width direction through the shift motion to shift the coulter by a distance corresponding to the tractor tread.

BRIEF DESCRIPTION OF THE DRAWINGS

FIG. 13 is a front view showing a coulter unit being inclined by 12°;

FIG. 14 is a front view showing a coulter unit being inclined by 9°;

DETAILED DESCRIPTION OF THE PREFERRED EMBODIMENTS

Preferred embodiments according to this invention will be described with reference to the accompanying drawings.

Figure 1:
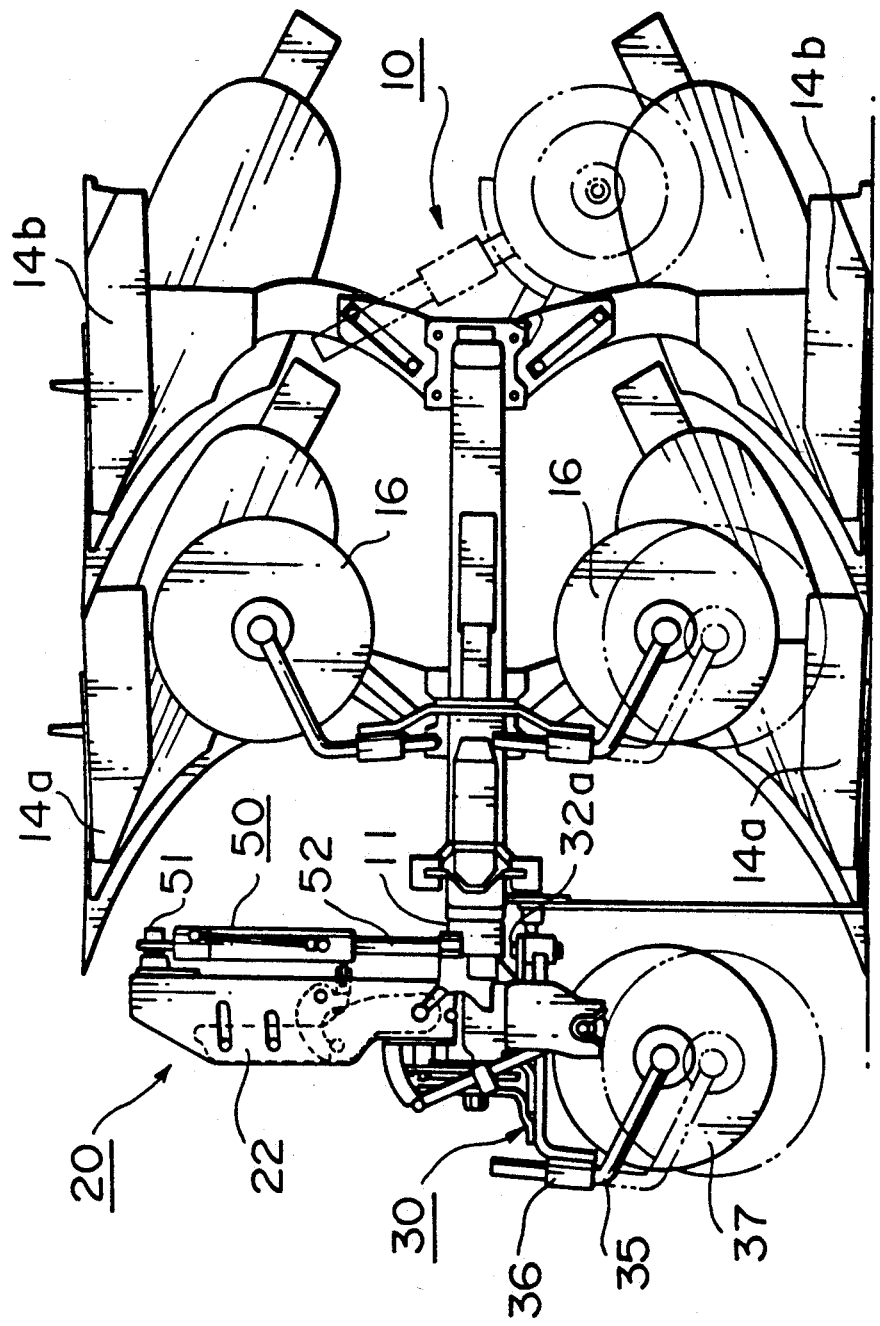
FIG. 1 is a side view of a reversible plow machine which is equipped with an embodiment of a coulter adjusting device according to the present invention.
Figure 2:
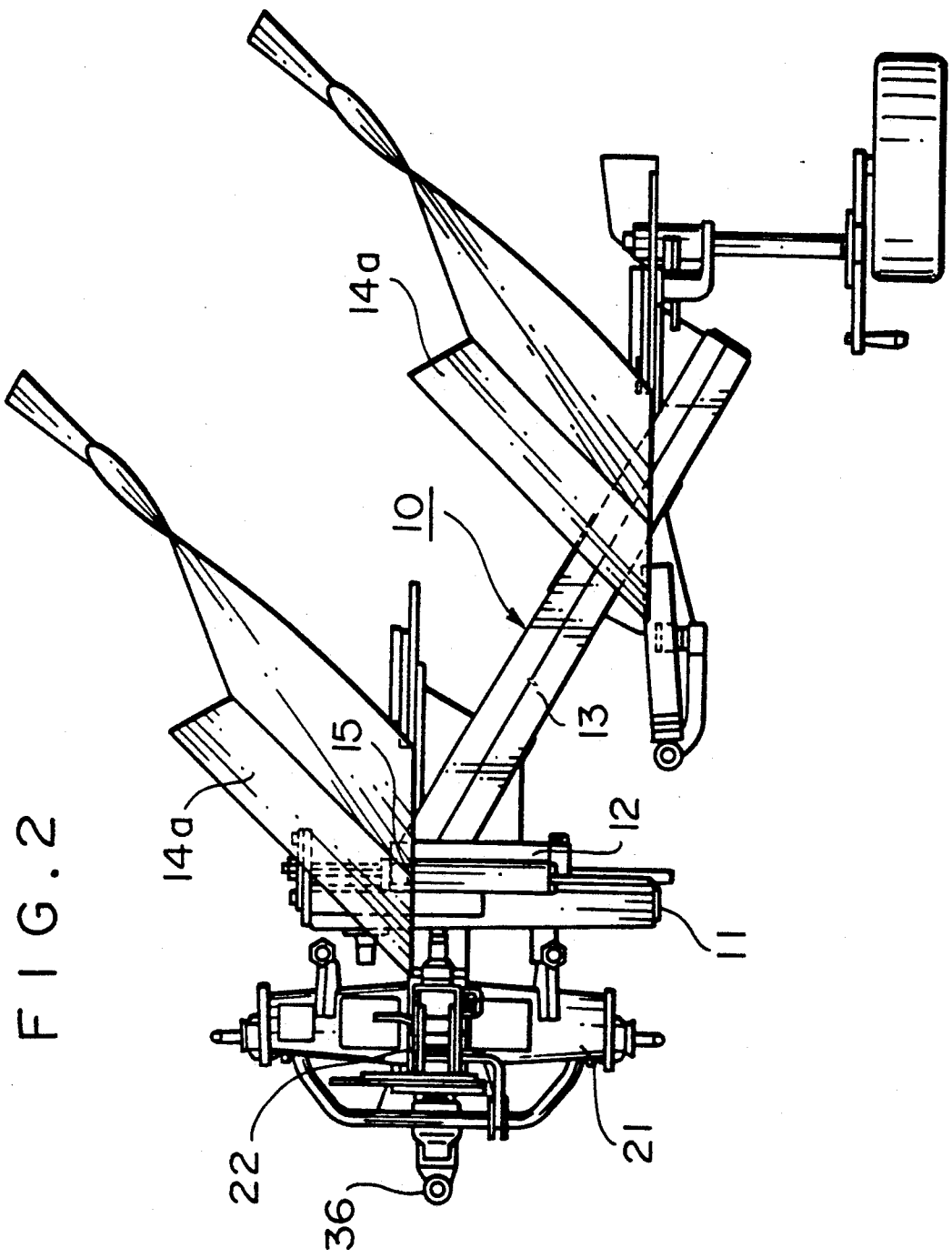
FIG. 2 is a top view of the reversible plow machine shown in FIG. 1.
Figure 3:
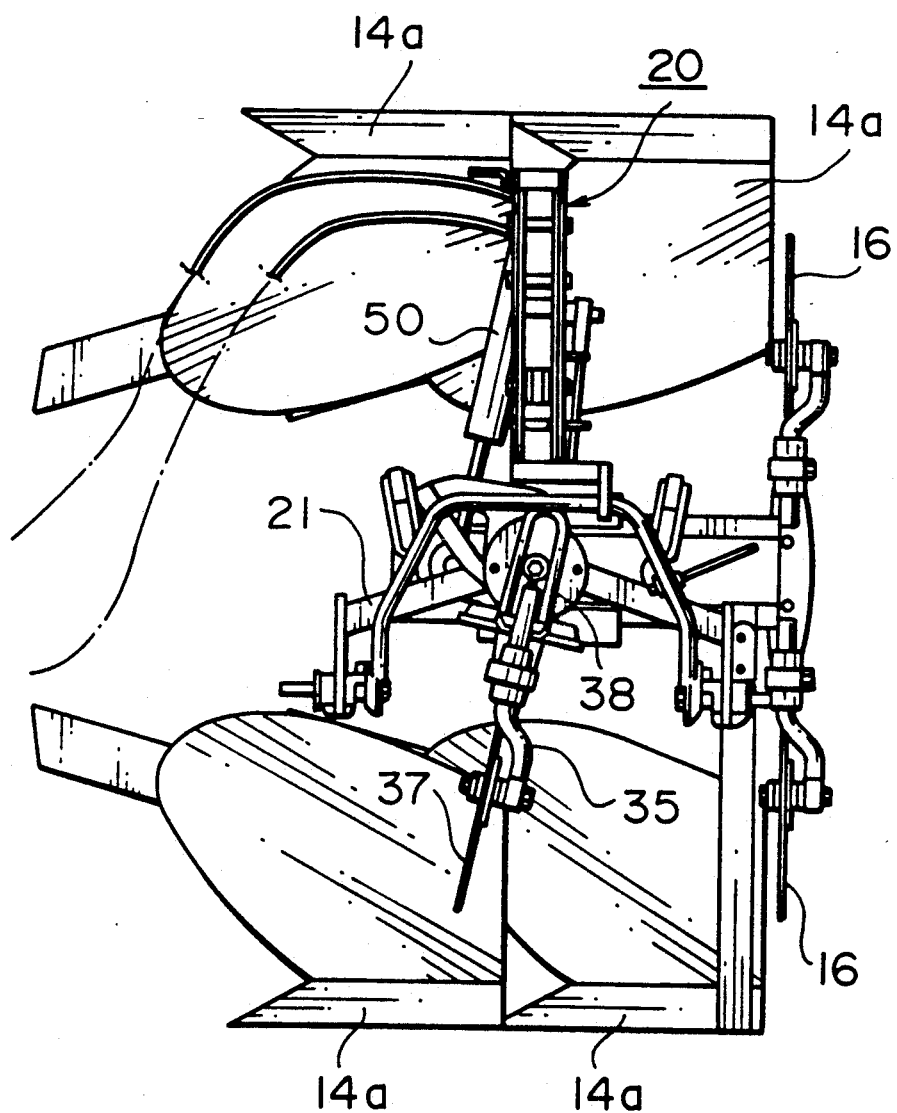
FIG. 3 is a front view of the reversible plow machine shown in FIG. 1.

FIG. 1 is a side view of a reversible plowing machine which is equipped with an embodiment of a coulter adjusting device according to this invention. The reversible plowing machine of this embodiment mainly includes a bottom frame 10, and as shown in FIGS. 1 and 2, the bottom frame 10 comprises a front frame 11 at a front side thereof, a slide frame 12 secured to the front frame 11 therealong, a rear frame 13 which rearwardly extends from the slide frame 12, and first and second pairs of bottoms 14a and 14b, each pair being provided at upper and lower portions of the rear frame 13.

Each pair of bottoms 14a (14b) at the upper and lower portions of the rear frame 13 has opposite plow-up (scrape-out) directions to each other, and thus the plowed-up soil is piled up alternately at the right and left sides with respect to the plowing direction with each reversing operation of the bottoms. Further, an oil cylinder 15 is provided between the rear frame 13 and the front frame 11 to move the slide frame 12 in a direction perpendicular to the plowing direction through its extension and contraction, so that the bottoms can be freely offset to a desired position and thus a once-selected orientation of the bottoms can be fixed.

Additionally, a first coulter 37 is used for the first bottoms 14a while two second coulters 16 are used for the second bottoms 14b. Like the conventional plowing machine, the second coulters 16 are mounted in front of the second bottoms 14b on the rear frame 13 so as to be rotatable (i.e., reversible) together with the rear frame 13, so that the coulters 16 are reversible integrally with the second bottoms 14b. If the bottom plowing machine has multi-linked (e.g., three-linked) bottoms, a pair of third coulters are also secured to the rear frame 13 such that they are reversible integrally with the third bottoms. On the other hand, as described in detail below, the first coulter 37 is secured to the non-reversible or fixed mast frame 20, and thus it is fixedly mounted on the mast frame 20.

Additionally, a rotatable shaft 17 is freely rotatably supported by a bearing member of the mast frame 20, and one end of the shaft 17 is secured to the front side of the front frame 11 of the plow frame 10.

Figure 11:
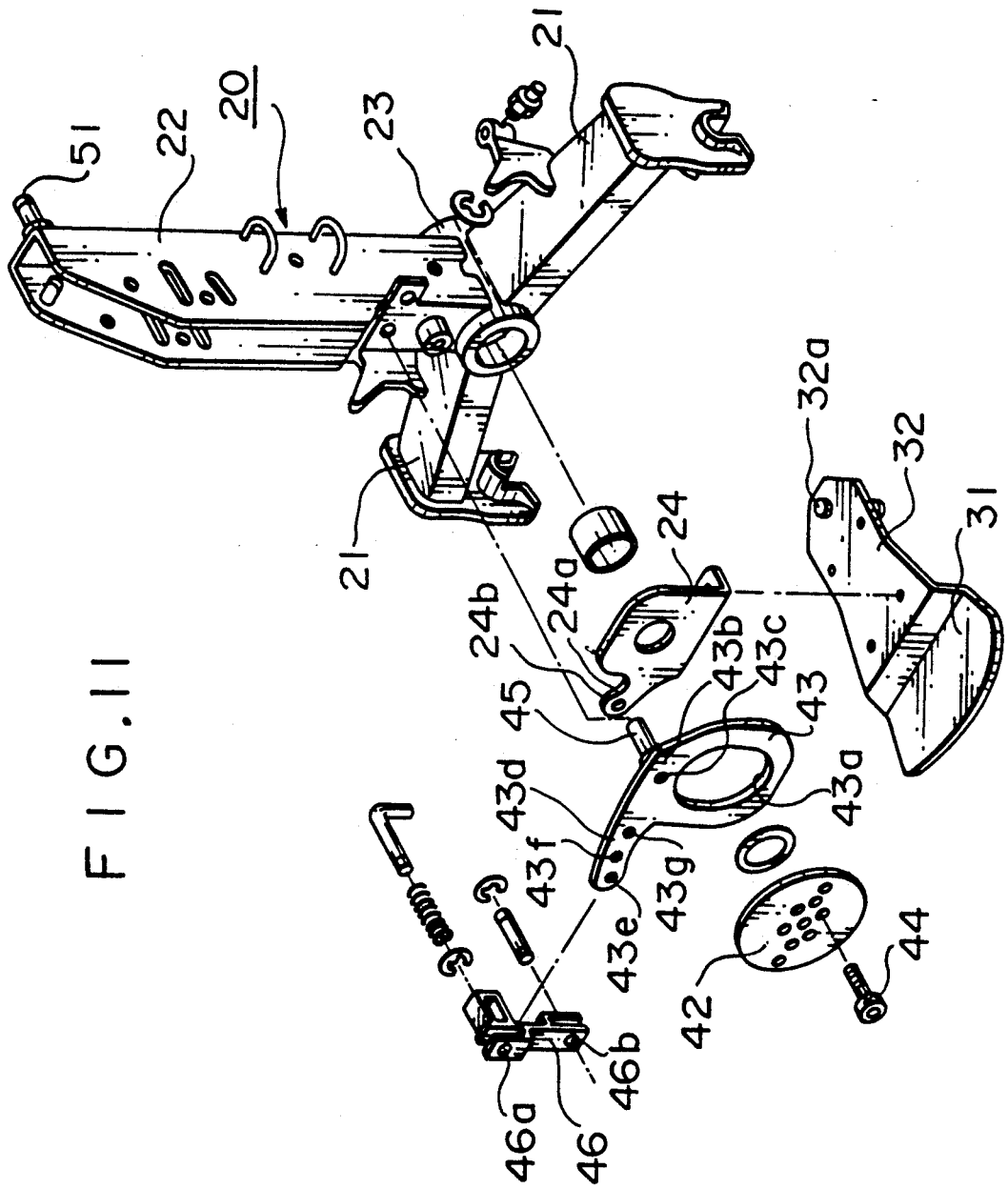
FIG. 11 is an exploded perspective view of a mast frame and a coulter adjustment device.

As shown in FIG. 11, the mast frame 20 includes a mast 22 which serves as a main part thereof, and a bifurcated lower frame 21 provided to the lower portion of the mast 22. The bifurcated lower frame 21 has two legs which extend along the width direction of plowing in opposite directions to each other, and the mast 22 is upwardly erected from the apex of the bifurcated lower frame 21. A tubular bearing 23 for supporting the rotatable shaft 17 therein is secured to a base portion of the mast 22. Another end of the rotatable shaft 17 is inserted into the tubular bearing 23, and is freely rotatably supported thereby.

A pair of coulter support members 24 and 25 each having an L-shaped section are secured to the bearing member 23 along the length direction thereof, and a coulter unit 30 as described below is supported by the coulter support members 24 and 25.

The coulter unit 30 includes a guide member 32 which has a sectorial guide portion 31 at the tip portion thereof and is secured to the frame 20 through a pivot shaft 32a at the other end thereof, and coulter unit body 33. One end of the coulter unit body 33 is pivotably mounted to the mast frame 20 coaxially with the pivot shaft 32a while the guide portion 31 of the guide plate 32 is mounted on the coulter unit body 33, so that the coulter unit body 33 is sectorially swingable around the pivot shaft 32a in the width direction of the plowing independently of the guide plate 32.

The other end of the coulter unit body 33 is vertically downwardly bent, and this bent portion serves as a support end portion 34. A bearing 36 is secured to the support end portion 34, and a coulter support shaft 35 is supported through a clamp 36a by the bearing 36. Additionally, the first coulter 37 for the first bottoms 14a is secured to the tip portion of the coulter shaft 35.

Figure 12:
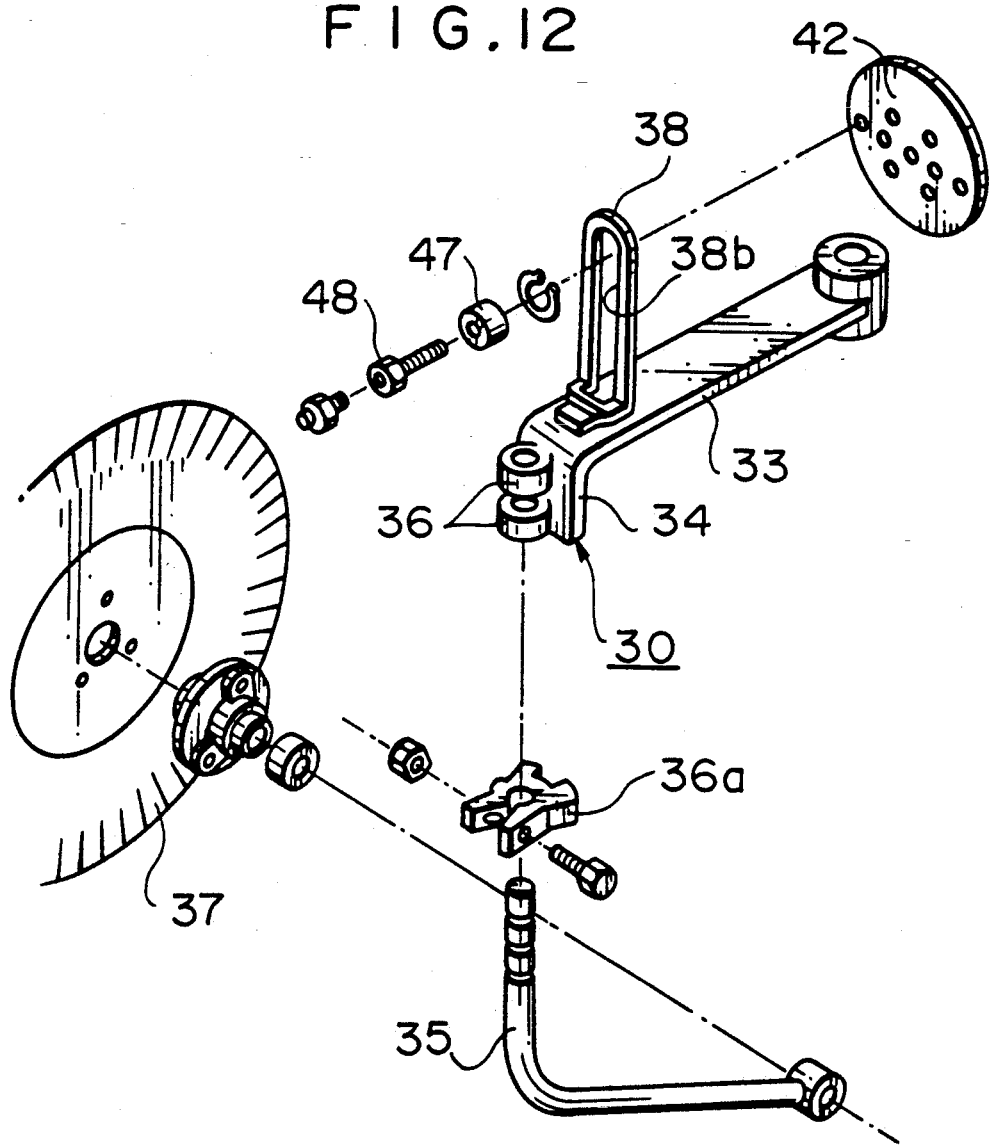
FIG. 12 is an exploded perspective view of a coulter unit.

Further, the base portion of the support end portion 34 of the coulter unit body 33 is secured to a base portion 38a of a swing arm 38. The swing arm 38 extends vertically to the coulter unit body 33, and a guide hole 38b is formed in the swing arm 38 so as to be elongated in the longitudinal direction of the swing arm 38, as shown in FIGS. 4 and 12.

Figure 4:
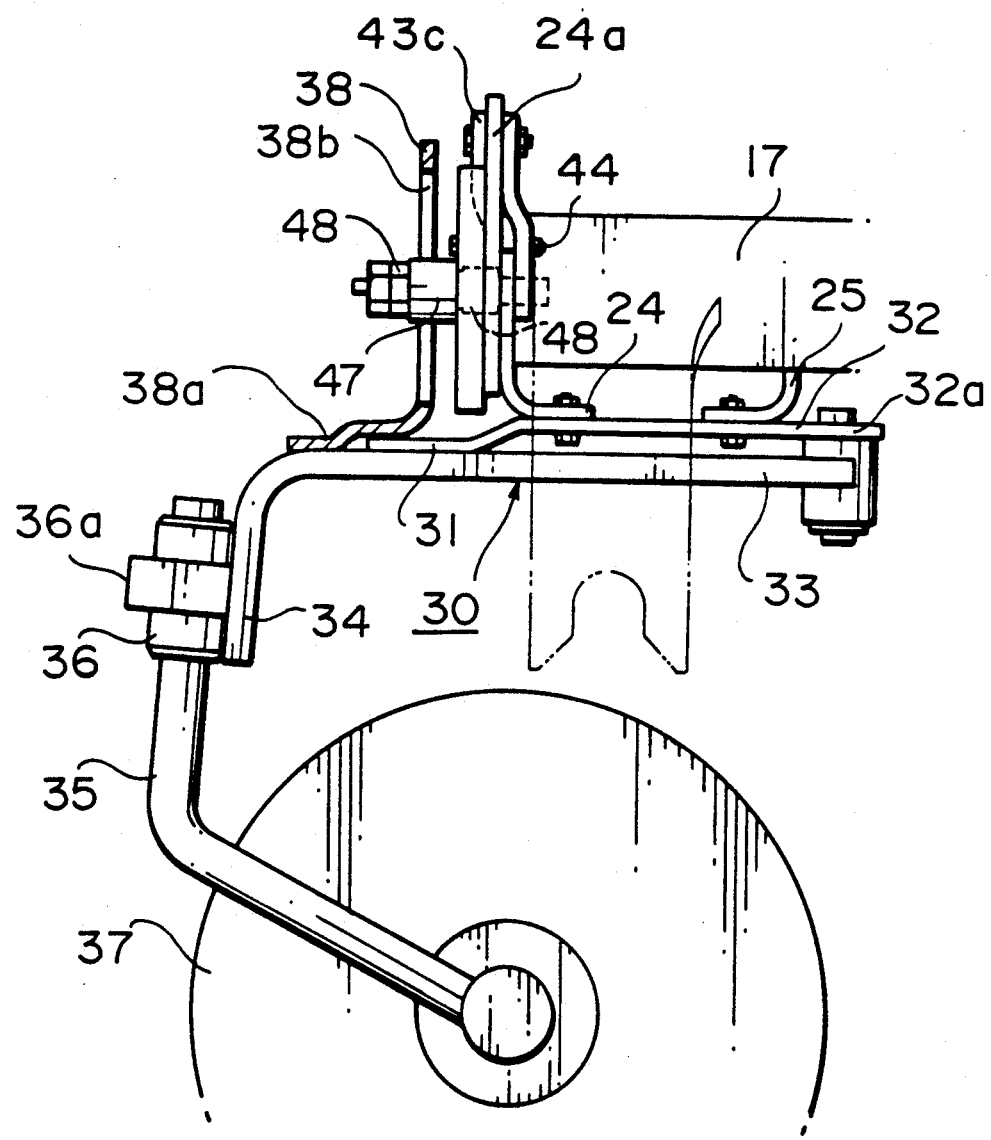
FIG. 4 is a detailed side view of a non-reversible member of the reversible plow machine shown in FIG. 1.
Figure 5:
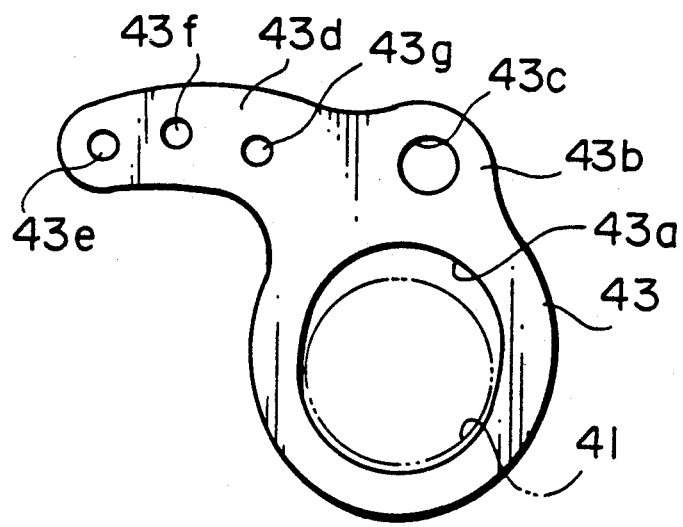
FIG. 5 is a front view of a guide plate.
Figure 6:
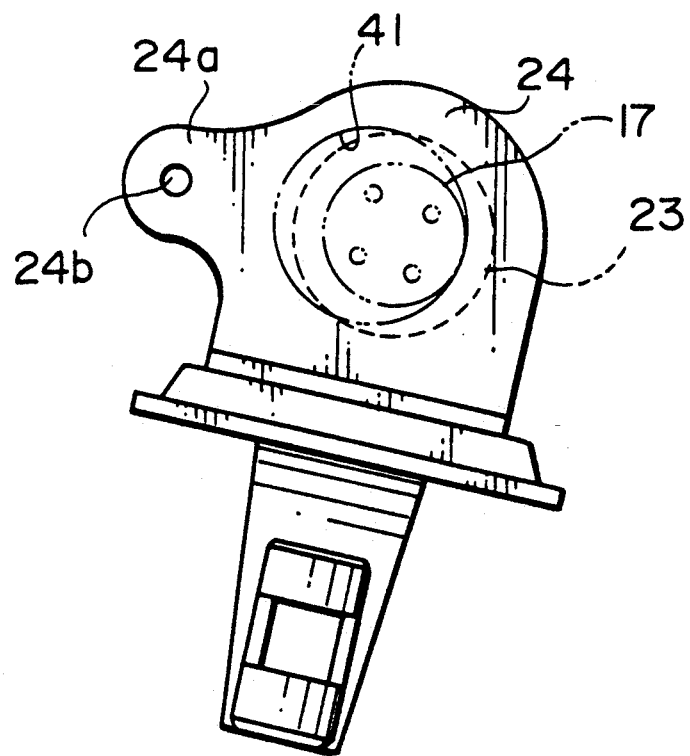
FIG. 6 is a front view showing a linkage state of a coulter support member and a coulter unit.

As shown in FIGS. 4 and 11, a cam plate 42 having a cam 41 whose center is eccentric to the rotatable shaft 17 is disposed so as to confront the end surface of the rotatable shaft 17 which is freely rotatably supported by the bearing member 23, and also a guide plate 43 having a vertically-elongated guide hole into which the cam 41 is engagedly inserted is disposed between the end surface of the rotatable shaft 17 and the cam plate 42. The cam plate 42 is fixedly secured to the end surface of the rotatable shaft 17 by four bolts 44 such that the rotational center of the cam 41 is eccentric to the rotational center of the rotatable shaft 17. Therefore, interlockingly with the rotation of the rotatable shaft 17, the guide plate 43 is swung through the engagement between the cam 41 and the elongated hole 43a because the cam 41 is eccentrically secured to the rotatable shaft 17.

As shown in FIG. 11, the guide plate 43 is provided with a projection 43b having a bolt hole 43c at the top portion thereof, and the guide plate 43 is swingably secured to the mast frame 20 by commonly inserting a pivot shaft 45 into the bolt hole 43c and a hole 20a formed in the mast frame 20. The guide plate 43 also has an arm 43d which extends from the top portion of the guide plate 43, and which is formed with selection holes 43e, 43f, and 43g at the tip portion thereof.

The coulter support member 24 also has an arm 24a which extends laterally and from one side thereof. The arm 24a is designed to be shorter than the arm 43d, and is formed with a window hole 24b at the tip portion thereof.

The arm 24 is linked to the arm 43d of the guide plate 43 through a link plate 46 having holes 46a and 46b at both end portions thereof. The hole 46a of the link plate 46 is linked to the window hole 24b of the arm 24a through a bolt, and the hole 46b is linked to a selected one of the selection holes 43e, 43f and 43g.

The selection holes 43e, 43f and 43g are used to keep the first coulter 37 vertical to the soil surface being plowed at all times. The selection of any one of the selection holes 43e, 43f and 43g is made in consideration of the inclination of the tractor which is varied in accordance with the plowing depth. For example, if the plowing depth is large, the tractor is more greatly inclined on a plane perpendicular to the plowing direction. In this case, the selection hole 43e is selected to incline (i.e., angularly move) the first coulter 37 in an opposite direction to the inclination direction of the tractor on the plane by a larger angle interlockingly with the reversing operation of the bottoms, so that the inclination of the tractor is countervailed by the inclination of the first coulter 37. Thus, the coulter 37 is kept vertical to the soil surface.

On the other hand, if the plowing depth is relatively small, the tractor is slightly inclined on the plane. In this case, the selection hole 43g is selected to incline the first coulter 37 by a smaller angle interlockingly with the reversing operation of the bottoms, so that the coulter 37 is kept vertical to the soil surface. Therefore, in both cases, the first coulter 37 is inclined or angularly moved by an angle corresponding to the tractor inclination, i.e., the plowing depth, so that the first coulter 37 can be kept vertical to the soil surface at all times.

The inclined state of the first coulter 37 in accordance with the selection of the selection holes 43e, 43f and 43g will be described below.

Figure 15:
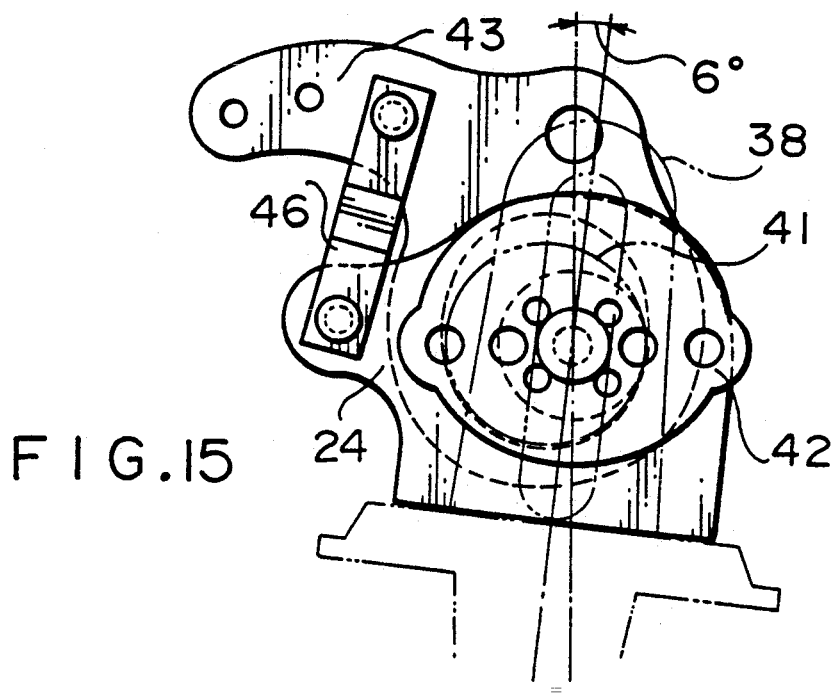
FIG. 15 is a front view showing a coulter unit being inclined by 6°.
Figure 16:
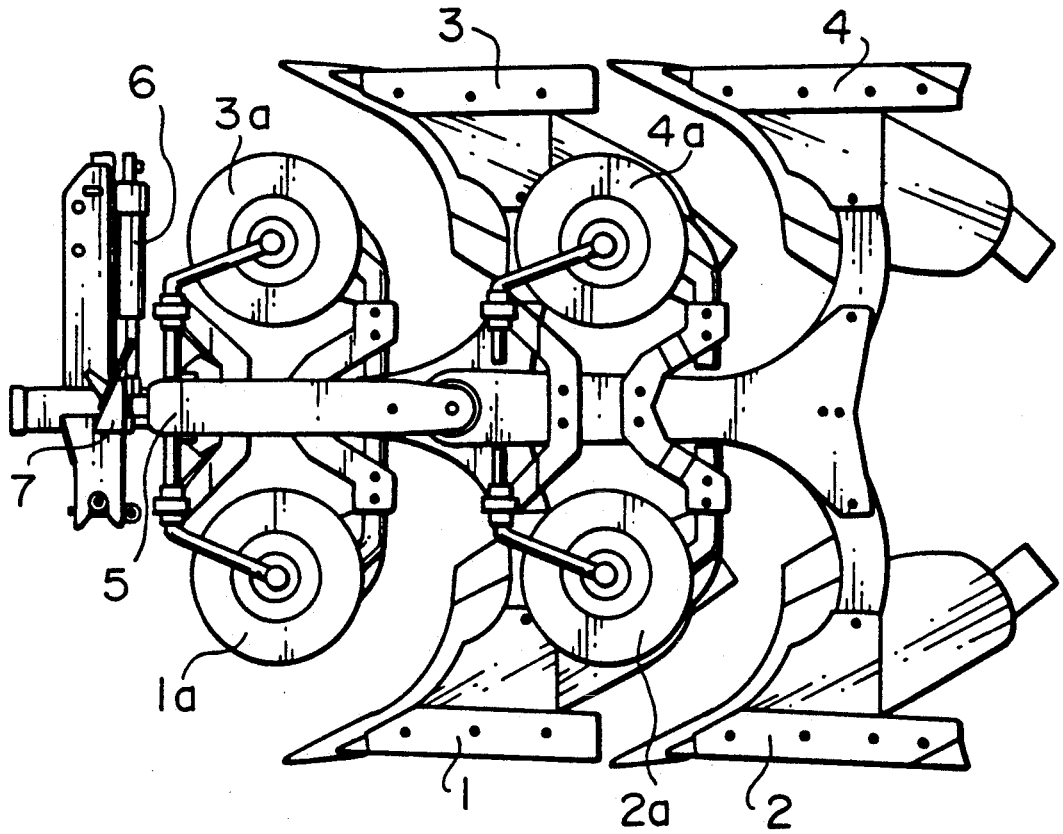
FIG. 16 is a side view of a conventional reversible plow machine.

If the selection hole 43e is selected and linked to the window hole 42b of the cam plate 42 through the link plate 46, the first coulter 37 is inclined to the right by 12° as shown in FIG. 13, and it is kept vertical to the soil surface being plowed. Likewise, the first coulter 37 is inclined to the right by 9° as shown in FIG. 14 upon selection of the selection hole 43f. Further, the first coulter 37 is inclined to the right by 6° as shown in FIG. 15 upon selection of the selection hole 43g.

In other words, the plowing depth is sectioned into three degrees, and any one of the selection holes 43e, 43f and 43g is selected in accordance with one of the degrees to keep the first coulter vertical to the soil surface at all times. For example, if the plowing depth is larger, the selection hole 43e is linked to the window hole 42b to keep the first coulter vertical to the soil surface (in this case, the first coulter is inclined by 12°, i.e., the largest angle, with respect to the tractor shown in FIG. 13). On the other hand, if the plowing depth is relatively small, the selection hole 43g is linked to the window hole 42b to keep the first coulter vertical to the soil surface. In this case, the first coulter is inclined by 6°, i.e., the smallest angle, with respect to the tractor shown in FIG. 15. If the plowing depth is an intermediate value between the largest and smallest values, the selection hole 43f is linked to the window hole 42b to keep the first coulter vertical to the soil surface. In this case, the first coulter is inclined by 9°, i.e., the intermediated angle, with respect to the tractor shown in FIG. 14.

Figure 7:
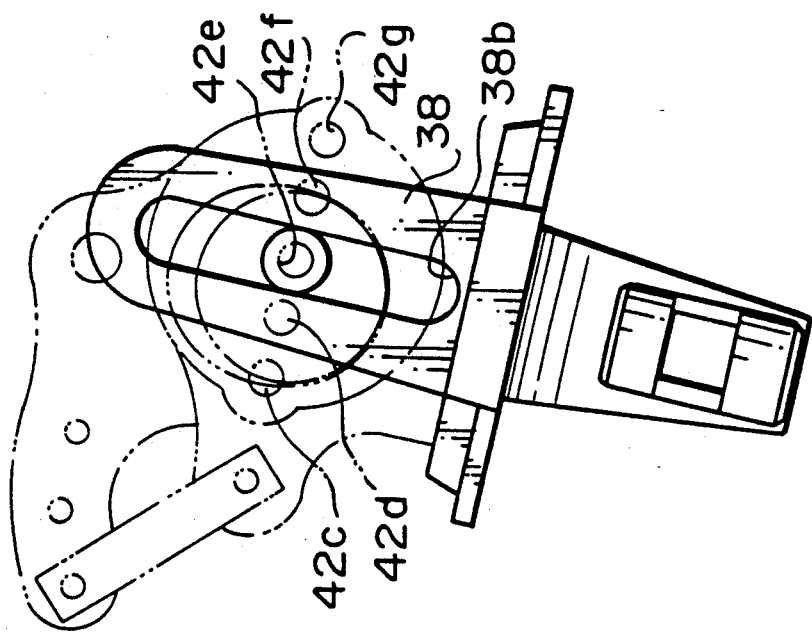
FIG. 7 is a front view showing a linkage state of a coulter support member, a guide plate and a coulter unit.
Figure 8:
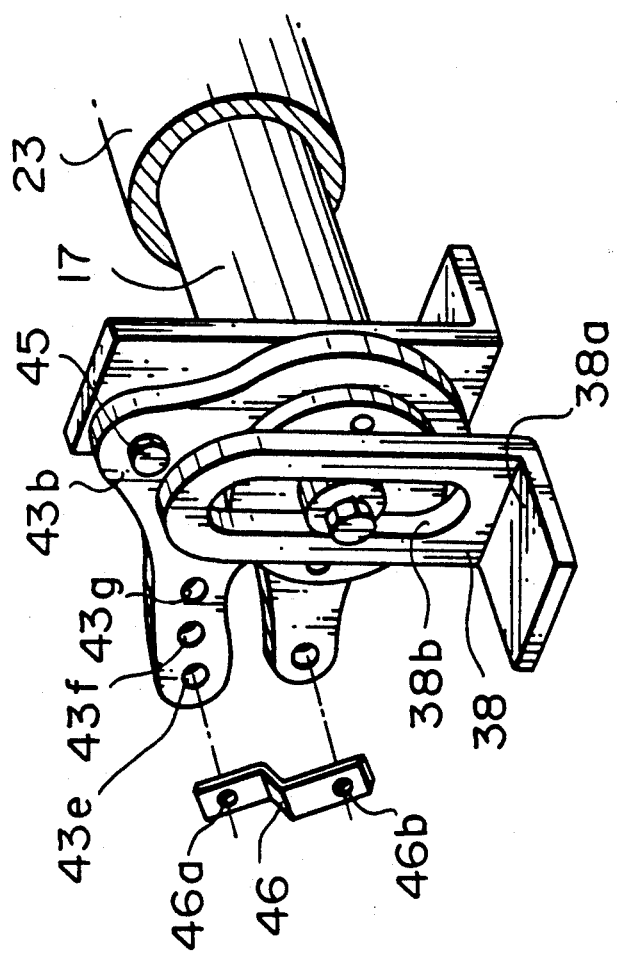
FIG. 8 is a perspective view of a linkage state of a coulter support member, a guide plate and a coulter unit.
Figure 9:
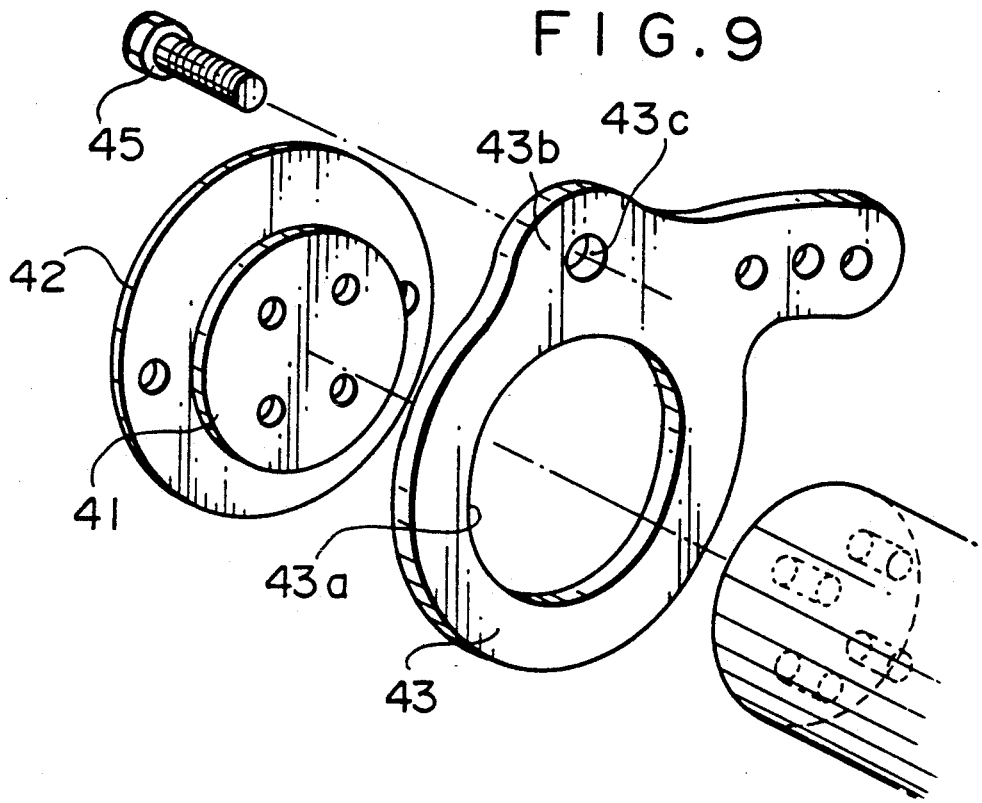
FIG. 9 is a perspective view of a cam plate and a guide plate.
Figure 10:
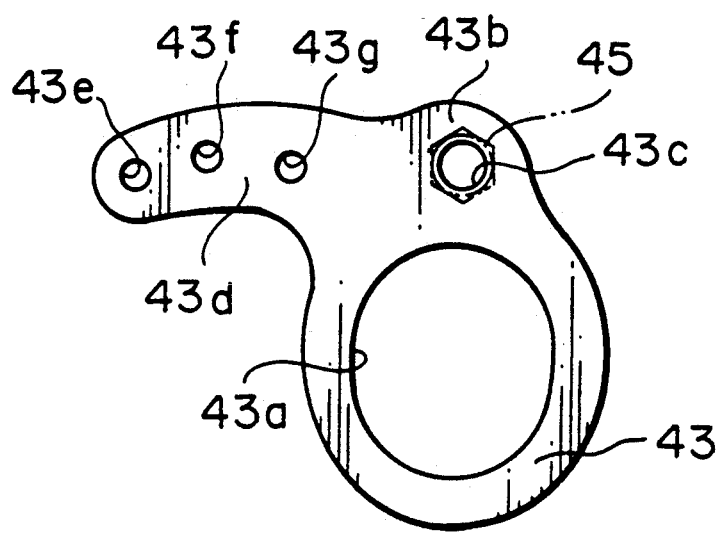
FIG. 10 is a front view of a guide plate.

Additionally, the cam plate 42 may be formed with plural adjustment bolt holes (or elongated holes) 42c to 42g (see FIG. 7) which are aligned at predetermined intervals along the width direction of plowing as shown in FIG. 12, and the cam plate 42 is secured to the swing arm 38 by commonly screwing a bolt 48 into one of the adjustment bolt hoes 42c to 42g and a roller 47 which is engaged with the guide hole 38b of the swing arm 38, as shown in FIG. 8. The intervals of the alignment of the adjustment bolts holes 42c to 42g are set in accordance with the tread difference between different kinds of tractors. For example, the tread is sectioned into, for example, five tread ranges from the smallest tread to the largest tread, and any one of the adjustment bolts holes 42c to 42g is selected in accordance with the tread range of the tractor used.

If the tractor tread is relatively smaller, the offset amount (shift amount) of the bottoms in the width direction of plowing resulting from the reversing operation of the bottoms is also smaller. Therefore, in this case the offset or shift amount of the first coulter 37 in the plow-width direction is set to be smaller. That is, the adjustment bolt hole 42e whose position is nearer to the center of the rotatable shaft 17 (i.e., the adjustment bolt hole having smaller eccentricity to the center of the rotatable shaft 17) is selected. If the offset of the bottoms scarcely occurs in the reversing operation, the adjustment bolt hole 42e whose position is nearest to the center of the rotatable shaft 17 is selected.

On the other hand, if the tractor tread is relatively larger and the offset amount of the bottoms in the reversing operation is the largest, the adjustment bolt hole 42c whose position is farthest from the center of the rotatable shaft 17 (i.e., the adjustment bolt hole having the largest eccentricity to the center of the rotatable shaft 17) is selected. By the selection of the adjustment bolt hole 42c, the swing amplitude of the swing arm 38 is set to be largest, so that the shift amount of the first coulter 37 in the width direction of plowing can be set to the largest value. That is, when the roller 47 is secured to the cam plate 42 through the adjustment bolt hole 42c, the swing amplitude of the swing arm 38 is largest in the reversing operation of the bottoms. The swing of the swing arm 38 enables the coulter support member 24 to be swung, that is, enables the first coulter 37 to be moved or shifted in the width direction of the plowing by a larger distance. At this time, the coulter 24 is partially rotated around the pivot shaft 32a along the guide portion 31 of the guide plate 32 relative to the first coulter 37.

A reserving cylinder 50 for reversing the bottoms is pivotably secured to the top portion of the mast 22 through a mount pin 51, and the front frame constituting the bottom frame and the other members behind the front frame are reversed by extending and contracting the reversing cylinder 50. That is, the reversing cylinder is supplied with pressurized oil from a hydraulic pump to carry out its extending and contracting motion. The end portion of a cylinder rod 52 of the reversing cylinder 50 is pivotably mounted on the front frame constituting the bottom frame 10. The oil supply to the reversing cylinder 50 is controlled by a hydraulic circuit having a switching valve which is switched by a pressure difference. First, the bottom frame 10 is rotated so as to be substantially erected by the contraction of the cylinder rod 52, and then reversed by extending the cylinder rod 52. The extension and contraction of the cylinder rod 52 are controlled through the switching operation of the switching valve. Accordingly, the bottoms are reversed after the plowing operation for one line to thereby keep the bottoms 14a and 14b for a next plowing operation at the lower side of the bottom frame while the bottoms for a previous plowing operation are kept at the upper side of the bottom frame.

As described above, according to the coulter adjusting device for the reversible plowing machine of this invention, the first coulter is secured to the mast frame serving as a non-reversible member through the coulter support member, and the coulter support member is swung interlockingly with the reversible operation of the plow frame to incline the first coulter by an angle corresponding to a plowing depth and/or to move the first coulter in the plowing width direction in accordance with the tractor tread used.

Thus, interlockingly with the reversing operation of the bottoms, the position of the first coulter can be automatically adjusted with a simple construction by inclining the first coulter in accordance with the plowing depth and/or by moving the first coulter by a predetermined offset amount. Therefore, the first coulter can be kept vertical to the field surface to be plowed at all times irrespective of the inclination of the tractor. Additionally, the first coulter can be reliably located in front of the reversed bottoms after the reversing operation of the bottoms.

What is claimed is:

1. A coulter adjusting device for use in a reversible plowing machine having a non-reversible mast frame, a bottom frame secured to the non-reversible mast frame in such a manner as to be rotatable relative to the non-reversible mast frame, a rotatable shaft for rotating the bottom frame, plural pairs of bottoms fixed to the bottom frame such that each pair of bottoms is secured to upper and lower sides of the bottom frame respectively, and coulters provided in correspondence with each pair of bottoms, at least one of the coulters being secured to the non-reversible mast frame, said coulter adjusting device including:

means for adjusting a position of the coulter secured to the non-reversible mast frame by moving the coulter on a plane perpendicular to a plowing direction by a desired amount in accordance with at least one of a plowing depth and a tractor tread interlockingly with a reversing operation of the bottom frame, wherein said adjusting means comprises coulter support means for supporting the coulter, and coulter moving means secured to said coulter support means for converting a reversing motion of the bottom frame to an eccentrically-rotational motion thereof to thereby move said coulter support means by an amount corresponding to an eccentric amount of said coulter moving means, said coulter moving means including means for converting the eccentrically-rotational motion to a motion of said coulter support means on the plane, said converting means comprising a cam plate which is movable interlockingly with the rotation of the bottom and has a plurality of holes arranged thereon at predetermined intervals so as to extend radially and which correspond to desired eccentric amounts, a selected one of the plurality of holes being linked to said coulter support means.

2. The coulter adjusting device as claimed in claim 1, wherein converting means includes swing means for converting the eccentrically-rotational motion to an angular motion of said coulter support means on the plane, the eccentric amount corresponding to an angle of the angular motion of said coulter support means to thereby incline the coulter on the plane by the angle interlockingly with the reversing motion of the bottom frame so that the coulter is maintained vertically to a soil surface.

3. The coulter adjusting device as claimed in claim 1, wherein said converting means includes means for converting the eccentrically-rotational motion to a shift motion of said coulter support means in a plow-width direction on the plane, the eccentric amount corresponding to a shift amount of the shift motion of said coulter support means to thereby shift the coulter on the plane by the shift amount interlockingly with the reversing motion of the bottom frame so that the coulter is maintained so to be located in front of the corresponding bottom.

4. A coulter adjusting device for use in a reversible plowing machine having a non-reversible mast frame, a bottom frame secured to the non-reversible mast frame in such a manner as to be rotatable relative to the non-reversible mast frame, a rotatable shaft for rotating the bottom frame, plural pairs of bottoms fixed to the bottom frame such that each pair of bottoms is secured to upper and lower sides of the bottom frame respectively, and coulters provided in correspondence with each pair of bottoms, at least one of the coulters being secured to the non-reversible mast frame, said coulter adjusting device including:

means for adjusting a position of the coulter secured to the non-reversible mast frame by moving the coulter on a plane perpendicular to a plowing direction by a desired amount in accordance with at least one of a plowing depth and a tractor tread interlockingly with a reversing operation of the bottom frame, wherein said adjusting means comprises coulter support means for supporting the coulter, and coulter moving means secured to said coulter support means for converting a reversing motion of the bottom frame to an eccentrically-rotational motion thereof to thereby move said coulter support means by an amount corresponding to an eccentric amount of said coulter moving means, wherein said coulter moving means includes swing means for converting the eccentrically-rotational motion to an angular motion of said coulter support means on the plane, the eccentric amount corresponding to an angle of the angular motion of said coulter support means to thereby incline the coulter on the plane by the angle interlockingly with the reversing motion of the bottom frame so that the coulter is maintained vertically to a soil surface, wherein said swing means comprises a cam plate which is swingable interlockingly with the rotation of the bottom frame and has a projection extending laterally from said cam plate, said projection being formed with plural holes arranged in a longitudinal direction thereof at predetermined intervals which are set to correspond to desired eccentric amounts, and any selected one of the plural holes being linked to said coulter support means.

5. A coulter adjusting device for use in a reversible plowing machine having a non-reversible mast frame, a bottom frame secured to the non-reversible mast frame in such a manner as to be rotatable relative to the non-reversible mast frame, a rotatable shaft for rotating the bottom frame, plural pairs of bottoms fixed to the bottom frame such that each pair of bottoms is secured to upper and lower sides of the bottom frame respectively, and coulters provided in correspondence with each pair of bottoms, at least one of the coulters being secured to the non-reversible mast frame, said coulter adjusting device including:

means for adjusting a position of the coulter secured to the non-reversible mast frame by moving the coulter on a plane perpendicular to a plowing direction by a desired amount in accordance with at least one of a plowing depth and a tractor tread interlockingly with a reversing operation of the bottom frame, wherein said adjusting means comprises coulter support means for supporting the coulter, and coulter moving means secured to said coulter support means for converting a reversing motion of the bottom frame to an eccentrically-rotational motion thereof to thereby move said coulter support means by an amount corresponding to an eccentric amount of said coulter moving means, wherein said coulter moving means includes means for converting the eccentrically-rotational motion to a shift motion of said coulter support means in a plow-width direction on the plane, the eccentric amount corresponding to a shift amount of the shift motion of said coulter support means to thereby shift the coulter on the plane by the shift amount interlockingly with the reversing motion of the bottom frame so that the coulter is maintained so as to be located in front of the corresponding bottom, and wherein said converting means comprises a cam plate having a cam whose center is eccentric to the rotational center of the bottom frame, said cam plate being secured to the bottom frame through the rotatable shaft in such a manner that the center of said cam is eccentric to a rotational center of the rotatable shaft, and being formed with means, arranged in a radial direction of said cam plate, for adjusting the eccentricity of said cam.

6. A coulter adjusting device for use in a reversible plowing machine having a non-reversible mast frame, a bottom frame secured to the non-reversible mast frame in such a manner as to be rotatable relative to the non-reversible mast frame, a rotatable shaft for rotating the bottom frame, plural pairs of bottoms fixed to the bottom frame such that each pair of bottoms are secured to upper and lower sides of the bottom frame respectively, and coulters provided in correspondence with each pair of bottoms, at least one of the coulters being secured to the non-reversible mast frame, said coulter adjusting device including:

means for adjusting a position of the coulter secured to the non-reversible mast frame by moving the coulter on a plane perpendicular to a plowing direction by a desired amount in accordance with at least one of a plowing depth and a tractor tread interlockingly with a reversing operation of the bottom frame, wherein said adjusting means comprises coulter support means for supporting the coulter, and coulter moving means secured to said coulter support means for converting a reversing motion of the bottom frame to an eccentrically-rotational motion thereof to thereby move said coulter support means by an amount corresponding to an eccentric amount of said coulter moving means, wherein said coulter support means comprises a guide plate which has a sectoral portion at a tip portion thereof and is pivotably secured to the mast frame at another end portion thereof, a coulter support member having one end portion secured to said guide plate, said coulter support member being disposed between the rotatable shaft and said coulter moving means so as to be movable interlockingly with rotational motion of the rotatable shaft, and a coulter unit body having a first end portion which is pivotably secured to the mast frame coaxially with said guide plate such that said guide plate is mounted on said coulter unit body and a second end portion which is downwardly bent and secured to the coulter.

* * * * *